United States Patent
Robinson

(10) Patent No.: US 6,195,013 B1
(45) Date of Patent: Feb. 27, 2001

(54) FLUID LEVEL SENSOR

(75) Inventor: Ben Robinson, Norwich (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/542,324

(22) Filed: Apr. 4, 2000

(30) Foreign Application Priority Data

Nov. 9, 1999 (GB) .................................................. 9926360

(51) Int. Cl.$^7$ .................................................. G08B 21/00
(52) U.S. Cl. .................. 340/623; 340/612; 137/397; 73/305; 73/308; 116/228
(58) Field of Search ..................................... 340/623, 624, 340/612, 618, 625; 137/397, 386; 73/305, 308, 309, 311, 315; 116/227, 228; 200/84 R, 84 C, 190

(56) References Cited

U.S. PATENT DOCUMENTS

| | | | |
|---|---|---|---|
| 3,857,004 | * 12/1974 | Kavthekar et al. | 200/84 C |
| 4,056,979 | * 11/1977 | Bongort et al. | 73/313 |
| 4,064,755 | * 12/1977 | Bongort et al. | 73/313 |
| 4,081,638 | * 3/1978 | Thorn et al. | 200/84 R |
| 4,103,265 | * 7/1978 | Siiberg | 335/205 |
| 4,467,156 | * 8/1984 | Dvorak et al. | 200/84 R |
| 4,479,915 | * 10/1984 | Tsubouchi et al. | 264/249 |
| 5,042,300 | * 8/1991 | Benjey et al. | 73/308 |
| 5,262,604 | * 11/1993 | Powell | 200/84 C |

FOREIGN PATENT DOCUMENTS

| | | |
|---|---|---|
| 1427343 | 3/1976 | (GB) . |
| 2053570A | 2/1981 | (GB) . |
| 2078010A | 12/1981 | (GB) . |
| 2182494A | 5/1987 | (GB) . |

* cited by examiner

Primary Examiner—Daniel J. Wu
Assistant Examiner—Daniel Previl
(74) Attorney, Agent, or Firm—Lonnie Drayer

(57) ABSTRACT

A float sensor that is modular has a mounting bracket which incorporates an O-ring seal and bayonet style resilient mounting fingers which lock the mounting bracket to a tank flange. A tube is ultrasonically welded to the mounting bracket and positions a reed switch housing which is ultrasonically welded to the end of the tube opposite the mounting bracket. The reed switch housing incorporates a stop positioned above a descending cone. The cone terminates in radially outwardly extending fingers that lock a float to the reed switch housing. The float is free to float upwardly along the cone to engage the stop. The float has a ring shaped magnet foamed in place within a low density plastic body. The presence of fluid buoys the float upwardly until the float engages the stop.

20 Claims, 4 Drawing Sheets

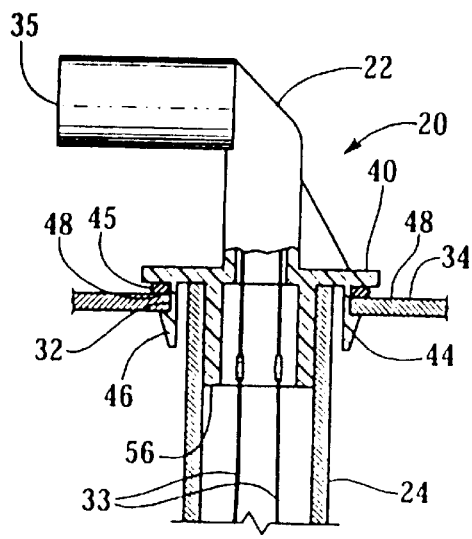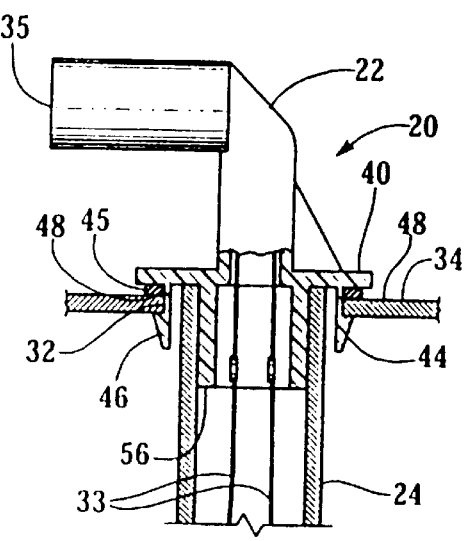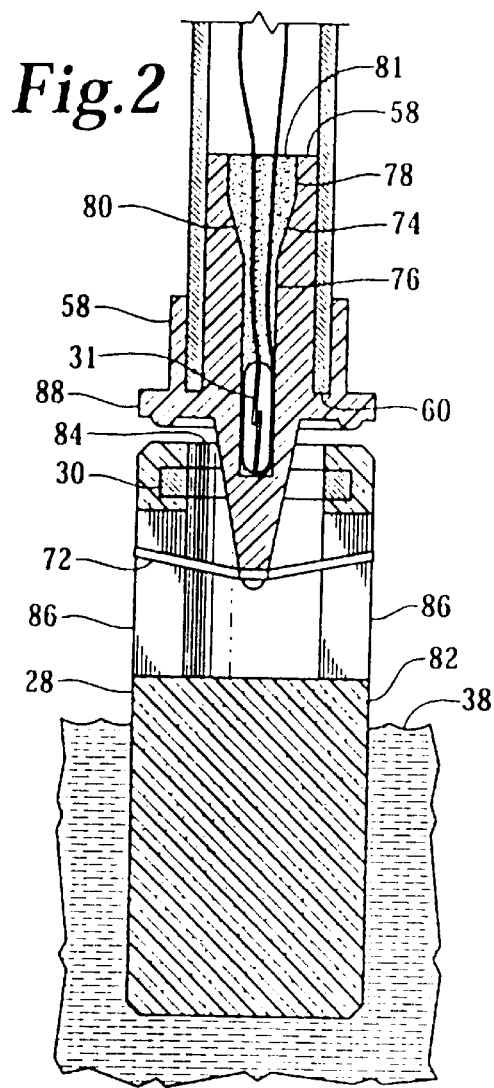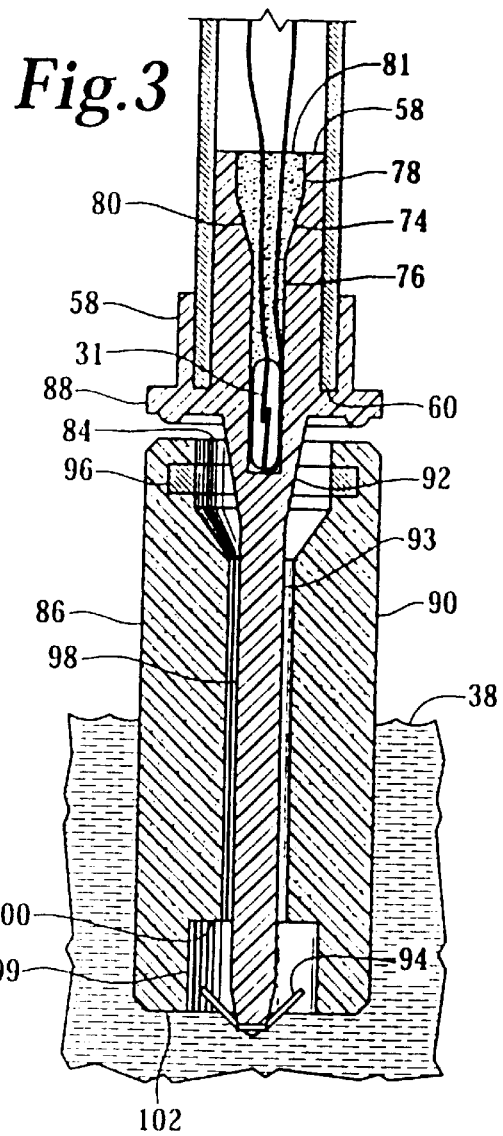
Fig.2  Fig.3

FLUID LEVEL SENSOR

FIELD OF THE INVENTION

The present invention relates to float sensors in general, and to float sensors employing a reed switch to detect the movement of a float in particular.

BACKGROUND OF THE INVENTION

Reed switches have long found use in float sensors where the inherent advantages of reed switches bring reliability and low cost to float sensor designs. The reed switch is a low-cost component and if properly designed can have a service life of millions of cycles. The reed switch, moreover, is hermetically sealed which is an advantage any time a switch is employed near liquids. A reed switch is actuated by a change in magnetic flux with respect to the reed switch. This means that the switch can be opened or closed by the movement of a magnet, which is some distance from the reed switch. The ability of the reed switch to respond to the movement of a magnet allows a float incorporating a magnet to actuate a switch in response to change in liquid levels, usually to close an electrical circuit.

To limit the current, which flows through a reed switch, a current limiting resistor will often be installed in series with the reed switch. By limiting the switch current, the life of the reed switch may be increased almost arbitrarily to more than one hundred million cycles.

Float sensors are typically employed to return a single digital bit upon a single condition. The condition often indicates a-fluid container is nearly full or nearly empty. In these days of broad band sensors, the continuing utility of a sensor that can reliably indicate a single condition has not decreased. In fact, reed switches are often employed with more sophisticated solid state sensors to provide greater reliability in detecting particular system conditions.

Float sensors employing reed switches are generally divided into two types: those where the float containing the activation magnet is mounted in a hinged manner and those where the float is constrained to movement along an axis by a central shaft, or by a surrounding tube.

DISCUSSION OF THE PRIOR ART

U.S. Pat. No. 5,239,285 shows a typical float sensor of the type where a float containing a ring-shaped magnet is constrained to move along a vertical axis by a central shaft. A reed switch contained within the shaft detects the movement of the magnet in the float as liquid causes the float to rise along the length of the central shaft. The shaft extends vertically downwardly from a bracket to which the central shaft is mounted. The shaft has a lower stop and an upper stop between which the float is moved by the rise and fall of fluid within a container. A reed switch is positioned within the shaft between the upper and lower stops so that motion of the float caused by a rise or fall of fluid level causes the reed switch to actuate.

Although reed switches have long been used by Original Equipment Manufacturer (OEM) suppliers to incorporate float sensors into their equipment, the new economy means that equipment suppliers want complete assemblies which provide the float sensor function which have a simple design interface. In this way the OEM supplier can decrease internal engineering while obtaining flexibility in outside design support, resulting in a faster, lower cost product cycle.

SUMMARY OF THE INVENTION

The float sensor of this invention provides a modular, adaptable float sensing module which can interface with a tank having a simple circular flange, wherein the upper and lower surfaces of the flange are parallel. The float has a mounting bracket which incorporates an O-ring seal and bayonet style resilient mounting fingers that lock the mounting bracket to the horizontal flange. The mounting bracket incorporates an electrical connector that forms the electrical interface. A tube of a selected length is bonded or ultrasonically welded to the mounting bracket and positions a reed switch housing a fixed distance downwardly into the tank from the horizontal flange. The reed switch housing is ultrasonic welded or bonded to the end of the tube opposite the mounting bracket to seal the lower end of the tube. The reed switch housing incorporates a stop positioned above a depending cone. The cone terminates in a plurality of radially outwardly extending fingers which lock a float to the reed switch housing, the float being free to float upwardly along the cone to engage the stop. The float is constructed of a ring shaped magnet, foamed in place within a low density plastic foam body that hangs beneath the stop when not supported by fluid within the tank. When fluid is present, the fluid buoys the float and the magnet contained therein upwardly until the float engages the stop. The magnet and reed switch are selected such that the reed switch is closed when the float engages the stop.

The present invention provides a modular float sensor that can be readily sized for a variety of different applications.

The present invention also provides a float sensor that can be rapidly assembled by hand or by machine.

The present invention further provides a float sensor that can be rapidly mounted to a standard interface without tools.

The present invention still further provides a float sensor that is cantilevered downwardly from a single support flange.

The present invention even further provides a float sensor that isolates the reed switch from the monitoring liquid.

Further features and advantages of the invention will be apparent from the following detailed description when taken in conjunction with the accompanying drawings.

BRIEF DESCRIPTION OF THE DRAWINGS

FIG. 2 is an enlarged cross-sectional view of the reed switch housing and float of FIG. 1.

FIG. 3 is an enlarged cross-sectional view of an alternative embodiment reed switch housing and float.

DETAILED DESCRIPTION OF THE INVENTION

Figure 1:
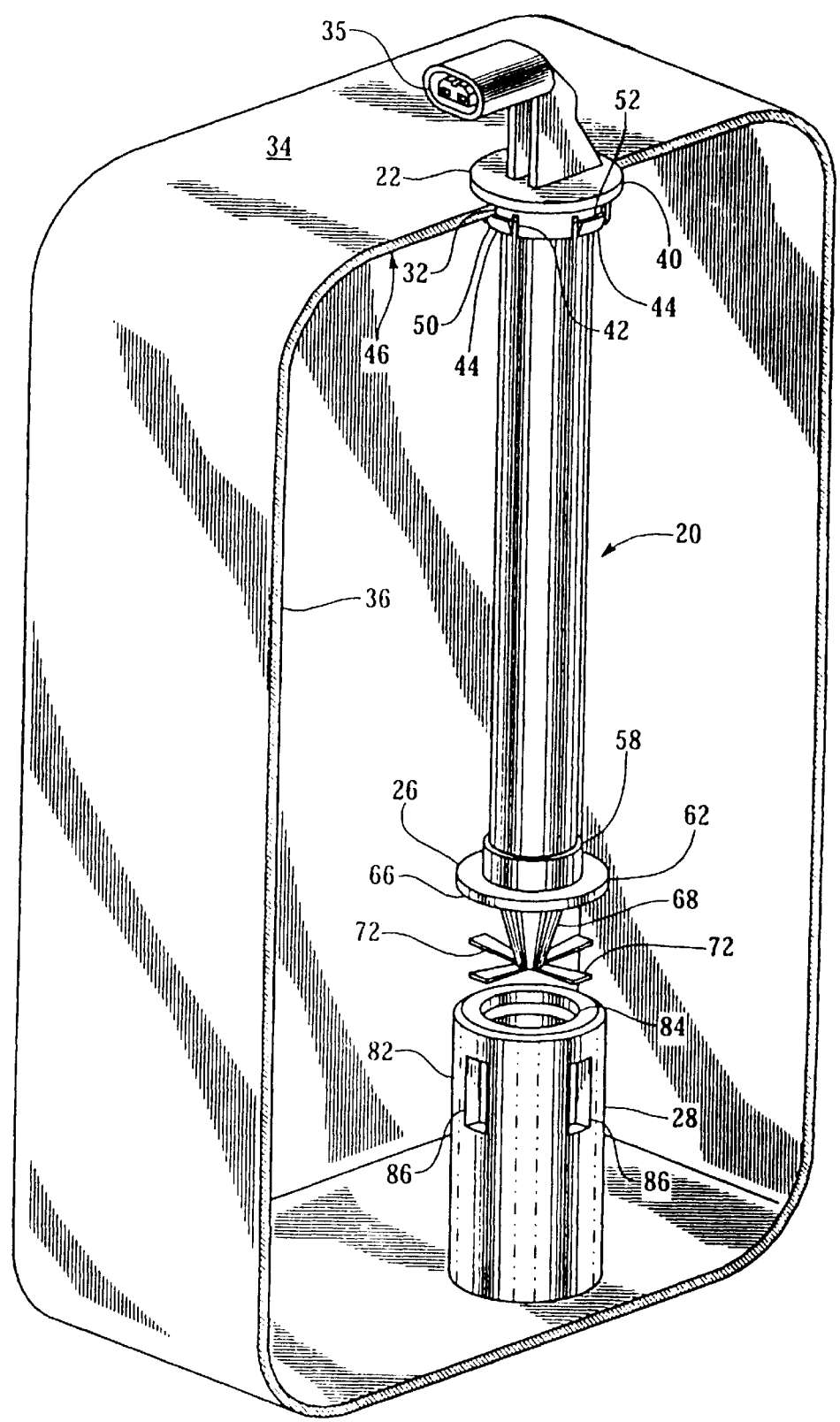
FIG. 1 is a side isometric view, partly exploded, of the float sensor of this invention installed in a tank, shown partially cut away in section.
Figure 4:
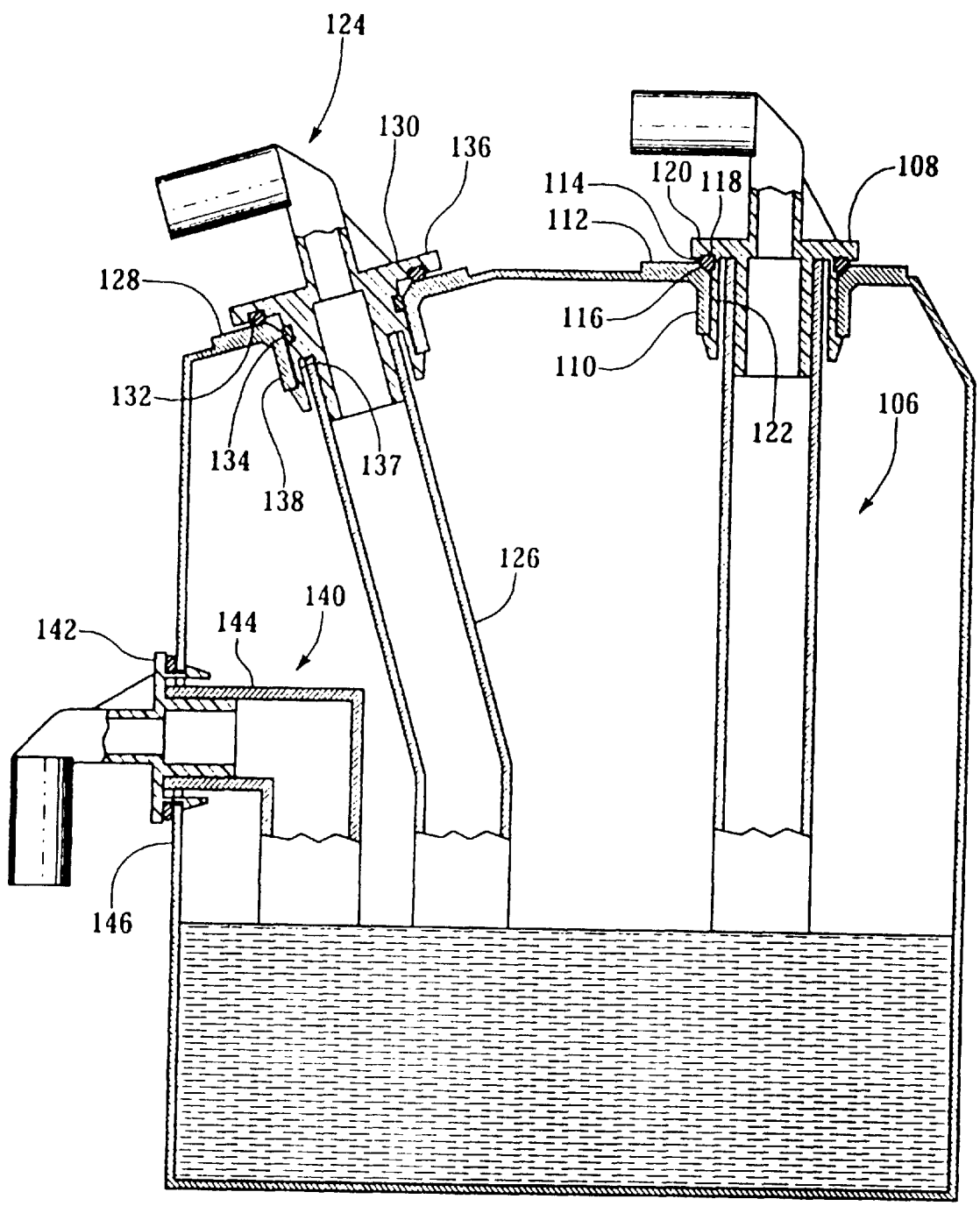
FIG. 4 is a side elevation pictorial view of several alternative embodiment float sensors.
Figure 5:
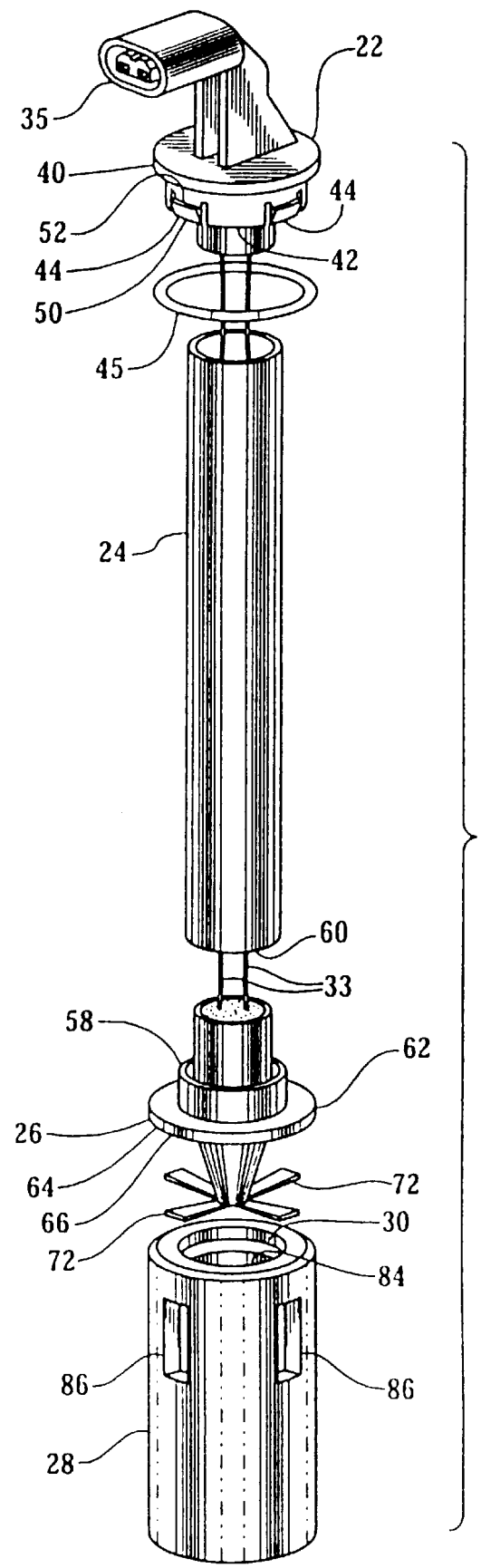
FIG. 5 is an exploded isometric view of the float sensor of FIG. 1.

Referring more particularly to FIGS. 1 to 5, wherein like numbers refer to similar parts, a float sensor 20 is shown in FIG. 1. The float sensor, as shown in FIG. 5, has four major components: a tank mounting bracket 22, a float positioning tube 24, a reed switch housing 26, and a float 28 incorporating a magnet 30. A reed switch 31 is positioned within the reed switch housing 26 and is connected by wires 33 to an electrical connector 35.

The float sensor 20 is readily adaptable to a variety of applications by combining an electrical connector which may be unique to each end user, with a positioning tube 24 of a selected length to position the float to detect a specific change in fluid level as specified by the end user. The interface between the float sensor, which may be supplied as a complete unit, and the tank, is both simple and minimal. The electrical connection employs a selected commercial or custom connector as specified. This simplifies and minimizes the interface control between the float sensor 20 and the system in which it is installed.

The mounting bracket 22 is designed to interface with a simple flat circular opening 32 formed in a side 34 of a tank 36 containing the fluid 38, the level of which it is desired to monitor. The mounting bracket 22 has a circular flange 40 which overlies the circular opening 32, a barrel section 42 which extends down into the tank 36 and a plurality of resilient bayonet fingers 44 which lock with the inside surface 46 of the tank 36. An elastic O-ring 45 is positioned between the circular flange 40 and a portion 48 of the flat exterior surface 34 which surrounds the circular opening 32. The mounting bracket 22 is installed in the tank 36 by pressing the bracket 22 downwardly through the circular opening 32. The downward pressure causes the inclined surfaces 50 on the bayonet fingers 44 to force the fingers radially inwardly allowing the fingers 44 to pass through the circular opening 32. The downward pressure also compresses the O-ring 45 until the locking surfaces 52 of the bayonet fingers 44 engage the tank 36 inside surface 46.

The float positioning tube 24 nests coaxially with a cylindrical downwardly extending portion 56 of the mounting bracket 22 of the float positioning tube 24. The float positioning tube 24 is ultrasonically welded or chemically bonded to the downwardly extending portion 56 of the mounting bracket 22 to form a strong hermetic seal. The length, wall thickness, and material choice and shape of the positioning tube 24 can be selected to meet particular requirements of an OEM tank manufacturer. In those cases where merely the position of the float 28 needs to be controlled, standard tubing can be cut to size, minimizing the number of parts that must be stocked. Control of inventory is axiomatic of the just-in-time manufacturing system where a close relationship with suppliers is used to minimize inventory and maximize quality control by providing a short supply chain between manufacturing and production.

Where the float sensor 20 is mounted in a vehicle or other high vibration environment, the rigidity of the positioning tube 24 can be controlled to detune the characteristic frequency of the float sensor system. Rigidity of the positioning tube 24 may be controlled by increasing the tube wall thickness or by selecting a more rigid material for fabricating the tube such as fiber-reinforced plastic or both.

The reed switch housing 26 incorporates a cylindrical upwardly extending flange 58 that coaxially slides over and nests with the lower end 60 of the positioning tube 24. The reed switch housing 26 is sealed to the positioning tube 24 by ultrasonic welding or chemical bonding the cylindrical flange 58 to the lower end 60 of the positioning tube 24 to form a hermetic and durable seal. A circular flange 62 extends radially outwardly from the housing 26 and defines a downwardly facing surface 64 which acts as a stop 66 which limits upward movement of the float 28. Concentric with the circular flange 62 and extending downwardly from the flange is a conical extension 68, the apex of which terminates with four equally spaced resilient barbs 72.

Coaxial with the cylindrical flange 58, the circular flange 62 and the conical extension 68, is a cavity 74. The cavity 74 has a narrow cylindrical portion 76 which extends downwardly into the conical extension 68 which holds the magnet sensing reed switch 31 which is connected to wires 33 which in turn interface with the electrical connector 35. The cavity 74 has a wide cylindrical portion 78 that is connected to the narrow cylindrical portion 76 by a tapered section 80. Potting compound 81, such as hot melt polyamide, can be used to fix the reed switch 31 in position within the reed switch housing 26.

The float 28 has a float body 82 and a foamed-in-place magnet 30. The magnet 30 is positioned near the top of the float body 82 and is of a generally annular or toroidal shape. The float 28 has a central opening 84 which passes through the magnet and into which the conical extension 68 fits as the float is buoyed upwardly against the stop 66. The float 28 is captured by the resilient barbs 72 that extend into four equally spaced slots 86. The motion of the float 28 is minimal, approximately 6 to 25 mm (0.25 to 1.0 inches). By minimizing float motion, the likelihood that the float will become jammed is minimized. The float may be sized to generate substantial buoyant and gravitation forces to maximize operational reliability. Motion of the float 28 carries the magnet 30 against the stop 66. The reed switch 31 is positioned so that the switch changes state, generally closes, when the float is positioned against the stop 66. Downward motion of the float 28 due to a fall in fluid level causes the magnet 30 to move away from the stop and the reed switch, resulting in the reed switch opening.

An alternative embodiment reed switch housing 88 and float 90 are shown in FIG. 3. The reed switch housing 88 and float 90 are constructed to provide lateral support against sloshing to the float 90. The reed switch housing 88 is identical to the housing 26, except that a conical extension 92 does not immediately terminate in a plurality of barbs but rather forms a downwardly extending shaft 93 which extends through the float 90 and terminates with resilient barbs 94. The float 90 supports an annular magnet 96 and has a central cylindrical opening 98 that receives the shaft 93. The cylindrical opening 98 expands to a larger diameter opening 99 to form a radially extending surface 100 near the lower end 102 of the float 90. The barbs 94 expand within a larger diameter opening 99 to lock the float between the barbs 94 and the stop 66.

Three alternative embodiment float sensors within a tank 104 are shown in FIG. 4. The uppermost float sensor 106 is similar to the float sensor 20 except the mounting bracket 108 interfaces with a cylindrical boss 110 which extends from the exterior surface 112 of the tank 104 downwardly into the tank. An O-ring 114 is seated between a conical surface 116 leading into the cylindrical boss 110 and a circumferential groove 118 formed between a planar flange 120 and a cylindrical portion 122 of the mounting bracket 108.

A second alternative embodiment float sensor 124 has an approximately sixty degree bend in a float positioning tube 126. The bend in the float positioning tube allows the float sensor 124 to be mounted from a surface 128 which is not horizontal. This capability may have utility in certain tank configurations where access to the top is not possible. The float sensor 124 also has an alternative embodiment mounting bracket 130 that incorporates a first O-ring 132 and a second O-ring 134. The first O-ring is positioned between a flange 136 and the exterior surface 112 of the tank 104, the second O-ring 134 is positioned between a cylindrical portion 137 of the mounting bracket 130 and a cylindrical sleeve 138 which extends downwardly into the tank 104.

A third alternative embodiment float sensor 140 has a mounting bracket 142, similar to mounting bracket 22, wherein the float positioning tube 144 allows mounting of a float sensor 140 from a vertical wall 146.

It should be understood that the float sensor mounting bracket and reed switch housing may be constructed as injection molded parts. The float may be constructed as a molded structural foam part, and the float positioning tube may be constructed as an extrusion, or an injection molded part.

It should also be understood that the float sensor may be assembled by ultrasonic welding, other types of plastic welding, or various bonding techniques as are suitable for the materials from which the components of the float sensor are fabricated.

It should be understood that reed switches that are normally closed or normally open could be used as the float sensing reed switch. Further a so-called FORM C configuration reed switch may be employed. A FORM C reed switch has one movable reed and two stationary reed contacts, all three reeds are ferromagnetic, however the contact area of one fixed reed, against which the movable reed is biased, is formed of a nonmagnetic metal which has been welded to the ferromagnetic lead. When exposed to a magnetic field, both fixed reeds assume the same polarity, which is opposite that of the movable reed, due to the presence of the non-magnetic metal, which forms a flux interrupter, the only attractive force of sufficient magnitude is between the moveable reed and the normally open reed so the moveable reed transfers from the contact on the normally closed reed to the contact on the normally open reed.

It should be understood that the wires 33 shown in FIGS. 2 and 3 may be connected with leads extending from the connector 35 through the bracket 22 into the tank 36 by crimping or by soldering. Alternatively the wires may be run through the bracket 22 and extend from the connector 35 to a length specified by the end user.

It should be understood that depending on the thickness of the tank wall the tank may be formed with a localized thickening about the opening for the float sensor mounting bracket.

It will also be understood that a current limiting resistor will typically be employed either within the reed switch housing or as part of the electronics that interfaces with the float sensor through the electrical connector.

It is understood that the invention is not limited to the particular construction and arrangement of parts herein illustrated and described, but embraces such modified forms thereof as come within the scope of the following claims.

I claim:

1. A float sensor comprising:
   a mounting bracket having a flange for mounting in sealing engagement to a wall of a liquid container, the mounting bracket having an electrical connector on a first side of the flange and a cylindrical sleeve on a side of the flange opposite the electrical connector;
   a float positioning tube having a first end forming a hermetic seal with the cylindrical sleeve on the mounting bracket and a second end extending away from the mounting bracket
   a reed switch housing forming a hermetic seal with the second end of the float positioning tube;
   a float stop formed on the reed switch housing;
   a reed switch contained within the reed switch housing and electrically connected to the electrical connector; and
   a float containing a magnet captured by a downwardly extending portion of the reed switch housing and constrained to move between a position below the stop to a position engaged with the stop, the total motion towards and away from the stop being between about 6 mm (0.25 inches) and about 25 mm (1.0 inches), the reed switch housing having resilient barbs which engage and retain the float.

2. The float sensor of claim 1 further comprising a resilient O-ring positioned on the cylindrical side of the mounting flange.

3. The float sensor of claim 1 wherein the reed switch housing has a downwardly extending shaft which extends through the float and terminates with the resilient barbs which extend outwardly to capture the float, the float having portions forming a central cylindrical opening which receives the shaft.

4. The float sensor of claim 1 wherein the reed switch housing has a downward extension which interfits with the float to attach the float to the reed switch housing but allows the float to move towards and away from the float stop as fluid buoys the float upwardly, and gravity pulls the float downward.

5. The float sensor of claim 1 wherein the float positioning tube is of substantially constant circular cross-section.

6. The float sensor of claim 1 wherein the mounting bracket can be mounted to a surface of the tank which is not horizontal, and wherein the float positioning tube extending from the mounting bracket is bent to position the reed switch housing and the float vertically within the tank.

7. The float sensor of claim 1 wherein the float stop defines a plane which passes through the reed switch within the reed switch housing.

8. An assembly of a float sensor and a liquid container:
   a liquid container having a container wall, the wall defining an outside surface and an inside surface, wherein portions of the wall define a hole passing through the wall between the outside surface and the inside surface;
   a mounting bracket having a flange larger than the hole which overlies the wall and the hole;
   a plurality of resilient members extending from the mounting bracket through the hole, each resilient member being biased radially outwardly of the hole, each resilient member having an engaging surface which engages the inside surface of the container to lock the container wall between the engaging surfaces and the flange;
   a float positioning tube having a first end forming a hermetic seal with the mounting bracket and a second end extending into the liquid container;
   a reed switch housing forming a hermetic seal with the second end of the float positioning tube;
   a float stop formed on the reed switch housing;
   a reed switch contained within the reed switch housing and electrically connected to the mounting bracket; and
   a float containing a magnet captured by a downwardly extending portion of the reed switch housing and constrained to move between a position below the stop to a position engaged with the stop, the reed switch housing having a downwardly extending shaft that extends through the float and terminates with resilient barbs which extend outwardly to capture the float, the float having portions forming a central cylindrical opening which receives the shaft.

9. The assembly of claim 8 further comprising a resilient O-ring positioned between the flange and the outside surface of the container wall which provides sealing between the mounting bracket and the container wall.

10. The assembly of claim 8 wherein the reed switch housing has a downward extension which interfits with the float to attach the float to the reed switch housing but allows the float to move towards and away from the float stop as fluid buoys the float upwardly, and gravity pulls the float downward.

11. The assembly of claim 8 wherein the mounting bracket incorporates an electrical connector.

12. The assembly of claim 8 wherein the float positioning tube is of substantially constant circular cross-section.

13. The assembly of claim 8 wherein the mounting bracket is mounted to a surface of the tank which is not horizontal, and wherein the float positioning tube extends from the mounting bracket is bent to position the reed switch housing and the float vertically within the tank.

14. The assembly of claim 8 wherein the float stop defines a plane which passes through the reed switch within the reed switch housing.

15. The assembly of claim 8 wherein the motion of the float on the reed switch housing towards and away from the stop is between about 6 mm (0.25 inches) and about 25 mm (1.0 inches).

16. The assembly of claim 8 further comprising a cylindrical boss which extends from the exterior surface of the tank downwardly into the tank about the hole formed in the tank wall, the cylindrical boss having a lowermost portion which defines a portion of the inside surface of the container, wherein the engaging surface of the resilient fingers of the mounting bracket engages the lowermost portion of the cylindrical boss to lock the container wall between the engaging surfaces and the flange.

17. An assembly of a float sensor and a liquid container:

a liquid container having a container wall making a first angle greater than zero with the horizontal, the wall defining an outside surface and an inside surface, wherein portions of the wall define a hole passing through the wall between the outside surface and the inside surface;

a mounting bracket having a flange larger than the hole which overlies the wall and the hole;

a float positioning tube having a first end forming a hermetic seal with the mounting bracket and a second end extending into the liquid container;

a reed switch housing forming a hermetic seal with the second end of the float positioning tube, wherein the float positioning tube is bent by an angle matching the first angle to position the reed switch housing vertically within the tank;

a float stop formed on the reed switch housing;

a reed switch contained within the reed switch housing and electrically connected to the mounting bracket; and a float containing a magnet captured by a downwardly extending portion of the reed switch housing and constrained to move between a position below the stop to a position engaged with the stop, the reed switch housing having a downwardly extending shaft which extends through the float and terminates with resilient barbs which extend outwardly to capture the float, the float having portions forming a central cylindrical opening which receives the shaft.

18. The assembly of claim 17 wherein the container wall is vertical.

19. The assembly of claim 17 wherein the reed switch housing has a downward extension which interfits with the float to attach the float to the reed switch housing but allows the float to move towards and away from the float stop as fluid buoys the float upwardly, and gravity pulls the float downward.

20. The assembly of claim 17 wherein the motion of the float on the reed switch housing towards and away from the stop is between about 6 mm (0.25 inches) and about 25 mm (1.0 inches).

* * * * *